United States Patent
Onodera et al.

(10) Patent No.: US 9,641,232 B2
(45) Date of Patent: May 2, 2017

(54) TRANSMISSION DEVICE AND WIRELESS COMMUNICATION METHOD THAT PROVIDES PRECODED TRANSMISSION DATA TO FIRST AND SECOND RECEPTION DEVICES

(71) Applicant: Sharp Kabushiki Kaisha, Osaka-shi, Osaka (JP)

(72) Inventors: Takashi Onodera, Osaka (JP); Hiromichi Tomeba, Osaka (JP); Alvaro Ruiz Delgado, Osaka (JP); Minoru Kubota, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 90 days.

(21) Appl. No.: 14/649,938

(22) PCT Filed: Nov. 1, 2013

(86) PCT No.: PCT/JP2013/079783
§ 371 (c)(1),
(2) Date: Jun. 5, 2015

(87) PCT Pub. No.: WO2014/087775
PCT Pub. Date: Jun. 12, 2014

(65) Prior Publication Data
US 2015/0333808 A1 Nov. 19, 2015

(30) Foreign Application Priority Data
Dec. 7, 2012 (EP) ................................ 2012-267737

(51) Int. Cl.
*H04B 7/04* (2017.01)
*H04W 72/08* (2009.01)
(Continued)

(52) U.S. Cl.
CPC ........... *H04B 7/0456* (2013.01); *H04B 7/024* (2013.01); *H04B 7/0452* (2013.01); *H04W 16/14* (2013.01); *H04W 72/082* (2013.01)

(58) Field of Classification Search
CPC .. H04B 7/0456–7/0486; H04W 72/08–72/082
See application file for complete search history.

(56) References Cited

U.S. PATENT DOCUMENTS

| | | |
|---|---|---|
| 2011/0281600 A1 | 11/2011 | Tanaka |
| 2012/0020425 A1* | 1/2012 | Lee .................. H04B 7/024 375/267 |

(Continued)

FOREIGN PATENT DOCUMENTS

| | | |
|---|---|---|
| JP | 2006-229536 A | 8/2006 |
| JP | 2010-171734 A | 8/2010 |

(Continued)

OTHER PUBLICATIONS

Official Communication issued in International Patent Application No. PCT/JP2013/079783, mailed on Jan. 28, 2014.

(Continued)

*Primary Examiner* — Marcus R Smith
(74) *Attorney, Agent, or Firm* — Keating & Bennett, LLP

(57) ABSTRACT

A base station device according to the present invention receives wireless frames transmitted by terminal devices in nearby cells, estimates the state of the propagation channels between the terminal devices in the nearby cells and itself, based on the received signals thereof, and performs precoding on transmission data addressed to terminal devices in its own cell, based on the estimation results of the propagation channel state, and transmits.

3 Claims, 8 Drawing Sheets

(51) Int. Cl.
*H04B 7/0456* (2017.01)
*H04B 7/0452* (2017.01)
*H04W 16/14* (2009.01)
*H04B 7/024* (2017.01)

(56) References Cited

U.S. PATENT DOCUMENTS

| | | | |
|---|---|---|---|
| 2012/0099460 A1 | 4/2012 | Murakami et al. | |
| 2012/0219043 A1* | 8/2012 | Ko | H04B 7/024 375/219 |
| 2012/0269077 A1* | 10/2012 | Bazzi | H04L 25/03343 370/252 |
| 2013/0203428 A1* | 8/2013 | Hwang | H04W 72/082 455/450 |
| 2014/0003274 A1* | 1/2014 | Clerckx | H04L 25/0204 370/252 |
| 2014/0056204 A1* | 2/2014 | Suh | H04W 72/1226 370/312 |
| 2014/0098793 A1* | 4/2014 | Hunukumbure | H04L 5/0023 370/332 |
| 2015/0131751 A1* | 5/2015 | Bayesteh | H04B 7/0413 375/267 |

FOREIGN PATENT DOCUMENTS

| | | | | |
|---|---|---|---|---|
| WO | 2011/004875 A1 | 1/2011 | | |
| WO | WO 2012128522 A2 * | 9/2012 | | H04L 25/0204 |

OTHER PUBLICATIONS

Spencer, Q. et al., "An Introduction to the Multi-user MIMO Downlink", IEEE Communication Magazine, vol. 42,Issue 10, Oct. 2004, pp. 60-67.

"IEEE P802.11 Wireless LANs Specification Framework for TGac", IEEE 802.11-09/0992r21, Jan. 2011, 49 pages.

* cited by examiner

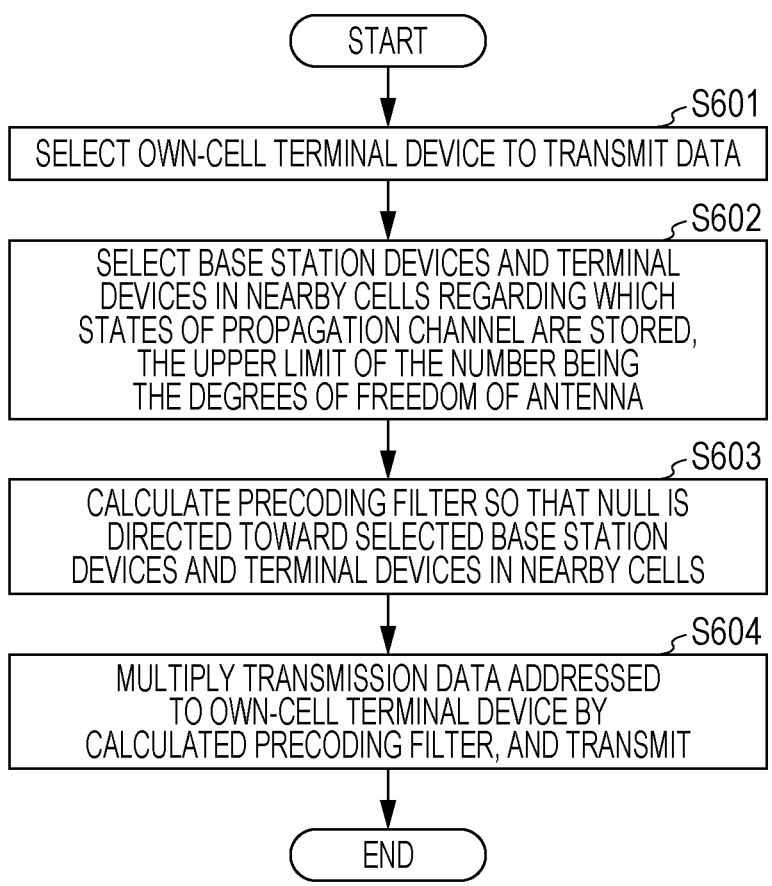

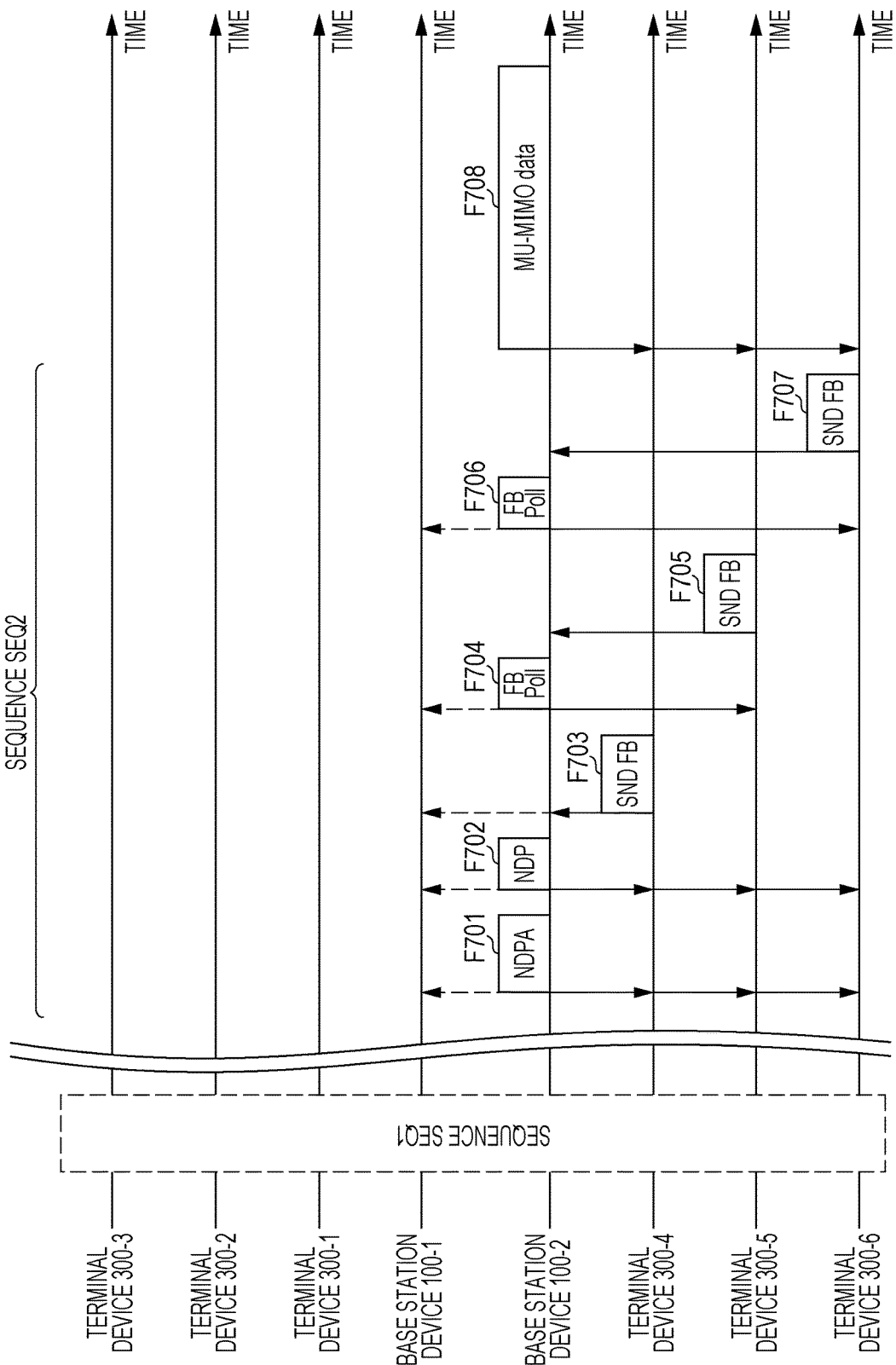

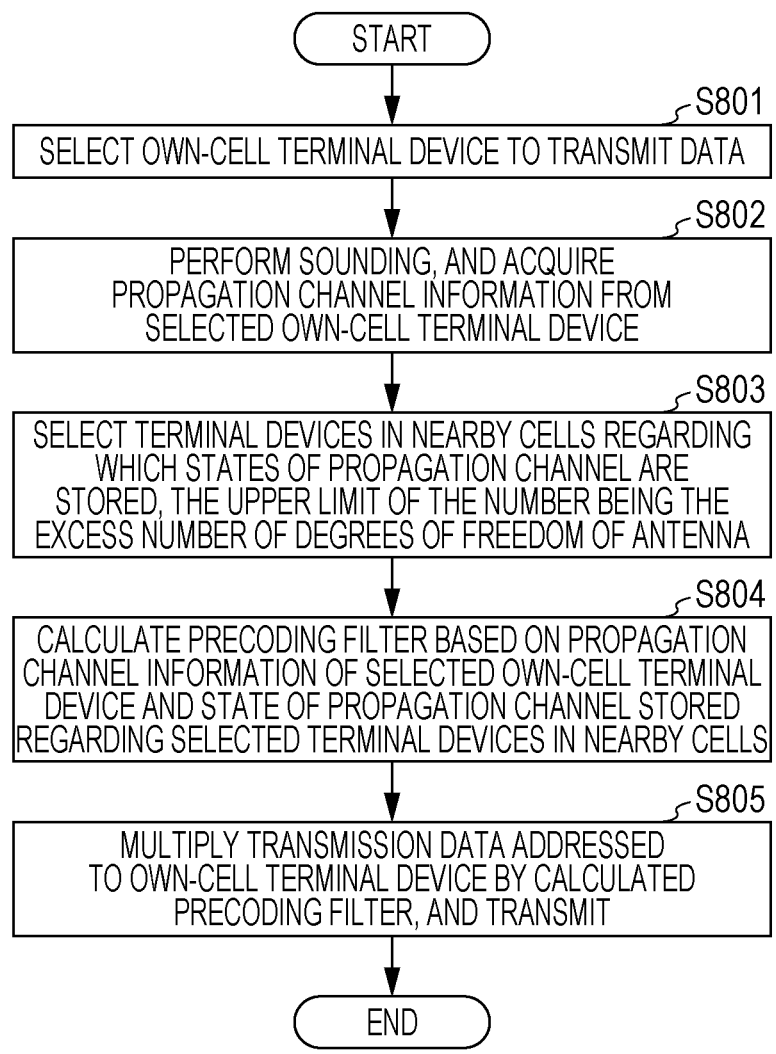

TRANSMISSION DEVICE AND WIRELESS COMMUNICATION METHOD THAT PROVIDES PRECODED TRANSMISSION DATA TO FIRST AND SECOND RECEPTION DEVICES

TECHNICAL FIELD

The present invention relates to a base station device, a wireless communication system, a wireless communication method, and an integrated circuit.

BACKGROUND ART

Multiple Input Multiple Output (MIMO) technology where wireless transmission is performed using multiple transmission/reception antennas is gathering attention as a technology which can greatly improve frequency usage efficiency, and is in practical use in cellular systems and wireless LAN systems and so forth. The amount of improvement in frequency usage efficiency by the MIMO technology is proportionate to the number of transmission/reception antennas. However, there is a limit to the number of transmission/reception antennas which can be provided to a terminal device serving as a reception device. Now, a downlink multi-user MIMO (MU-MIMO) where multiple terminal devices connected at the same time are handled as a virtual large-scale antenna array, and transmission signals from a base station device (transmission device) to the terminal devices are spatially multiplexed, is effective in improving frequency usage efficiency.

The spatially-multiplexed transmission signals addressed to the terminal devices (users) are received at the terminal devices as inter-user interference (IUI), resulting in marked property deterioration if nothing is done. There have been several methods proposed (NPL 1) where transmission signals can be generated with suppressed IUI at the time of reception by the terminal devices, without placing a great load on the terminal devices, if the base station device knows the state of the propagation channels from the transmission antennas of the base station device to the reception antennas of the terminal devices.

For example, there is a method where the transmission signals are subjected to precoding at the base station device before transmission, so as to be received at the terminals devices in a state where IUI has been suppressed. An example thereof is linear precoding (LP) where transmission signals are precoded by linear processing. An example of linear precoding is zero-forcing (ZF) precoding in which the transmission signals are weighted (the transmission signals are multiplied by $W=H^{-1}$) where an inverse matrix $H^{-1}$ (or pseudo inverse matrix $H'=H^H(HH^H)^{-1}$ where the superscript H represents the Hermitian conjugate) is used as a weighting matrix (linear filter) W, obtained from a propagation channel matrix having complex propagation channel gains among the transmission antennas and the reception antennas of the terminal devices obtained from information representing the state of propagation channels (channel state information: CSI) as its elements. Another example of linear precoding is minimum mean square error (MMSE) precoding where transmission signals are weighted by a weighting matrix (linear filter) $W=H^H(HH^H+\alpha I)^{-1}$ (where I represents a unit matrix and $\alpha$ represents a normalization coefficient). Linear precoding (linear beam forming) where the base station multiples the transmission signals beforehand by a linear filter, calculated based on propagation channel information notified from the terminal devices, to suppress IUI, is employed in cellular systems such as LTE (Long Term Evolution) and LTE-Advanced, and wireless LAN systems such as IEEE 802.11ac and so forth, for example.

On the other hand, wireless LAN has rapidly come into widespread used in recent years, due to increased demand for high-speed wireless communication networks in offices and homes. Next-generation LAN is being drawn up by the TGac of IEEE (The Institute of Electrical and Electronic Engineers, Inc.) 802.11, and extending the channel frequency band beyond 80 MHz and introducing the above-described MU-MIMO is being studied (NPL 2), aiming for realization of throughput of 1 Gbps or higher.

CITATION LIST

Non Patent Literature

NPL 1: Spencer et al. "An Introduction to the Multi-User MIMO Downlink", IEEE Communication Magazine, Vol. 42, Issue 10, p. 60-67, October 2004

NPL 2: "IEEE P802.11 Wireless LANs Specification Framework for TGac", IEEE 802.11-09/0992r21, January 2011

SUMMARY OF INVENTION

Technical Problem

However, the widespread use of wireless LANs has led to multiple wireless LAN access points (base station devices) sharing the same frequency channels, so an environment where the respective service regions (cells) overlap readily occurs, and accordingly there is a problem of deteriorating cell throughput.

The present invention has been made in light of the above situation, and it is an object thereof to provide a base station device, wireless communication system, wireless communication method, and integrated circuit where the base station device autonomously suppresses interference at the terminal devices in nearby cells in an overlapping cell environment such as described above, thereby improving throughput.

Solution to Problem

To achieve the above object, the following means were implemented in the present invention. That is to say, a base station device according to the present invention includes: a wireless receiver that receives first wireless frames, which are wireless frames transmitted by a terminal device of a nearby cell; a propagation channel estimator that estimates the state of a propagation channel between the terminal device of the nearby cell and an own base station device, based on received signals of the first wireless frame; a precoder that performs precoding on transmission data addressed to a terminal device in an own cell, based on estimation results of the state of the propagation channel; and a wireless transmitter that transmits transmission data subjected to the precoding.

A wireless communication system according to the present invention is configured including a base station device and a terminal device. The base station device receives wireless frames transmitted by a terminal device of a nearby cell, estimates the state of a propagation channel between the terminal device of the nearby cell and the own base station device, based on received signals of the wireless frame, and performs precoding on transmission data addressed to the terminal device of an own cell and transmits, so that a null is directed toward a corresponding terminal device of the nearby cell, based on estimation results of the state of the propagation channel.

A wireless communication system according to the present invention is configured including a base station device and a terminal device. The base station device receives wireless frames transmitted by a terminal device of a nearby cell, estimates the state of a propagation channel between the terminal device of the nearby cell and the own base station device, based on received signals of the wireless frame, and suppresses inter-user interference at the time of spatially multiplexing and simultaneously transmitting transmission data addressed to one or more terminal devices of an own cell, based on propagation channel information notified from the one or more terminal devices of the own cell and the estimation results of the state of the propagation channel, and also performs precoding on transmission data addressed to the one or more terminal devices of the own cell so that a null is directed toward a terminal device of the nearby cell corresponding to estimation results of the state of the propagation channel, and transmits the precoded data.

A wireless communication method according to the present invention is a wireless communication method for performing communication between a base station device and a terminal device. The base station device includes a step of receiving wireless frames transmitted by a terminal device of a nearby cell, a step of estimating the state of a propagation channel between the terminal device of the nearby cell and the own base station device, based on received signals of the wireless frame, a step of performing precoding on transmission data addressed to the terminal device of an own cell, so that a null is directed toward a corresponding terminal device of the nearby cell, based on estimation results of the state of the propagation channel, and a step of transmitting the signals subjected to the precoding.

A wireless communication method according to the present invention is a wireless communication method for performing communication between a base station device and a terminal device. The base station device includes a step of receiving wireless frames transmitted by a terminal device of a nearby cell, a step of estimating the state of a propagation channel between the terminal device of the nearby cell and the own base station device, based on received signals of the wireless frame, a step of receiving propagation channel information notified from a terminal device of an own cell, based on the state of the propagation channel between the own base station device and the terminal device, a step of suppressing inter-user interference at the time of spatially multiplexing and simultaneously transmitting transmission data addressed to one or more terminal devices of the own cell, based on propagation channel information notified from the one or more terminal devices of the own cell and the estimation results of the state of the propagation channel, and also performing precoding on transmission data addressed to the one or more terminal devices of the own cell so that a null is directed toward a terminal device of the nearby cell corresponding to estimation results of the state of the propagation channel, and a step of transmitting the signals subjected to the precoding.

An integrated circuit according to the present invention causes a base station device to exhibit a plurality of functions, by being installed in the base station device. The integrated circuit causes the base station device to exhibit a series of functions of a function of receiving wireless frames transmitted by a terminal device of a nearby cell, a function of estimating the state of a propagation channel between the terminal device of the nearby cell and the own base station device, based on received signals of the wireless frame, a function of performing precoding on transmission data addressed to the terminal device of an own cell, so that a null is directed toward a corresponding terminal device of the nearby cell, based on estimation results of the state of the propagation channel, and a function of transmitting the signals subjected to the precoding.

An integrated circuit according to the present invention causes a base station device to exhibit a plurality of functions, by being installed in the base station device. The integrated circuit causes the base station device to exhibit a series of functions of a function of receiving wireless frames transmitted by a terminal device of a nearby cell, a function of estimating the state of a propagation channel between the terminal device of the nearby cell and the own base station device, based on received signals of the wireless frame, a function of receiving propagation channel information notified from the terminal device of an own cell, based on the state of the propagation channel between the own base station device and the terminal device, a function of suppressing inter-user interference at the time of spatially multiplexing and simultaneously transmitting transmission data addressed to one or more terminal devices of the own cell, based on propagation channel information notified from one or more terminal devices of the own cell and the estimation results of the state of the propagation channel, and also performing precoding on transmission data addressed to the one or more terminal devices of the own cell so that a null is directed toward a terminal device of the nearby cell corresponding to estimation results of the state of the propagation channel, and a function step of transmitting the signals subjected to the precoding.

Advantageous Effects of Invention

A base station device can autonomously suppress interference at terminal devices in nearby cells in an overlapping cell environment of multiple base station devices, thereby improving throughput.

BRIEF DESCRIPTION OF DRAWINGS

FIG. 6 is a flowchart illustrating an example of the flow of transmission/reception processing at a base station device according to the first embodiment of the present invention.

FIG. 7 is a time chart illustrating an example of transmission/reception of wireless frames among base station devices and terminal devices in a second embodiment of the present invention.

FIG. 8 is a flowchart illustrating an example of the flow of transmission/reception processing at a base station device according to a second embodiment of the present invention.

DESCRIPTION OF EMBODIMENTS

Embodiments of the present invention will be described below with reference to the attached drawings. Components which are functionally the same are denoted by the same numerals in the attached drawings. While these attached drawings illustrate specific embodiments and implementations conforming to the principle of the present invention, these are for facilitating understanding of the present invention, and are by no means to be used to interpret the present invention restrictively.

(First Embodiment)

Figure 1:
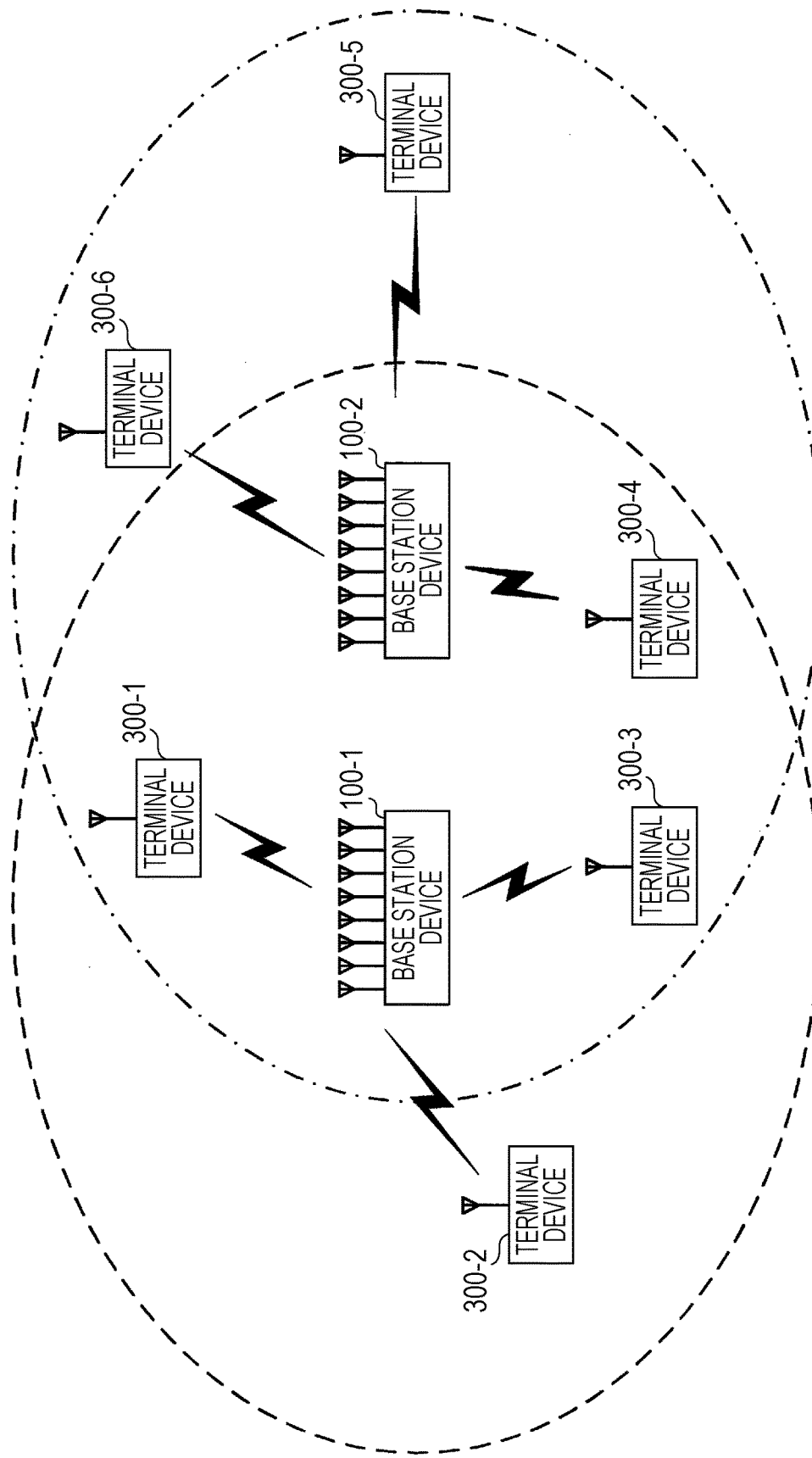
FIG. 1 is a schematic configuration diagram illustrating a configuration example of a wireless communication system according to the present invention.

FIG. 1 is a diagram illustrating a schematic configuration example of a wireless communication system according to the present invention. The wireless communication system according to the present embodiment includes two base stations which are base station device 100-1 and base station device 100-2 (both base station devices also collectively referred to as base station device 100) and multiple terminal devices 300-1 through 300-6 (these terminal device also collectively referred to as terminal device 300) connected to and communicating with at least one of the base station devices.

The base station device 100-1 has connected thereto the terminal device 300-1, terminal device 300-2, and terminal device 300-3, and the base station device 100-2 has connected thereto the terminal device 300-4, terminal device 300-5, and terminal device 300-6. The base station device 100-1 and base station device 100-2 use the same frequency channel, the cell which is the service region of the base station device 100-1 (the region encompassed by the dashed line in FIG. 1) and the cell which is the service region of the base station device 100-2 (the region encompassed by the dotted-dashed line in FIG. 1) making up a partly-overlapping environment (overlapping cells).

In the example in FIG. 1, the terminal device 300-1 and terminal device 300-3 connected to the base station device 100-1 receive wireless signals transmitted from the base station device 100-2 making up the nearby cell (with a power sufficient to where the signals cannot be considered to be noise), and wireless signals transmitted by the terminal device 300-1 and terminal device 300-3 are received by the base station device 100-2 of the nearby cell. In the same way, the terminal device 300-4 connected to the base station device 100-2 receive wireless signals transmitted from the base station device 100-1 making up the nearby cell (with a power sufficient to where the signals cannot be considered to be noise), and wireless signals transmitted by the terminal device 300-4 are received by the base station device 100-1 of the nearby cell.

Note that in a wireless LAN system, a group made up of one base station device and one or more terminal devices connected thereto is called a BSS (Basic Service Set), and the region where the BSS forms a wireless communication network is equivalent to the cell. The environment where the cells share the same frequency channel and overlap is called an OBSS (Overlapping BSS) environment.

Under such an OBSS environment, during transmission of wireless signals by the base station device or terminal device of one cell, or during a channel usage time set thereby (Transmission Opportunity: TXOP), the base station device and terminal devices of the other cell cannot perform communication, so the throughput of the cell markedly deteriorates.

In the present embodiment, the base station device 100-2 monitors the communication process of the base station device 100-1 of the nearby cell requesting notification of propagation channel information from the terminal devices 300 (part or all of the terminal device 300-1 through 300-3) in the cell. The base station device 100-2 estimates the state of the propagation channels between the terminal devices 300 and the base station device 100-2 in the nearby cell from monitoring the communication process. The base station device 100-2 then performs precoding on the transmission signals to the terminal devices 300 in its own cell based on the propagation channel estimation results, so that the signals do not reach the terminal devices 300 of the nearby cell, and thereupon transmits the wireless signals.

While description will be made regarding propagation channel information with reference to an example of a case where complex propagation channel gain between the antennas of the base station devices 100 and antennas of the terminal devices 300 and the covariance values thereof, or channel state information (CSI) representing values calculated of converted therefrom, are used, but this is to restrictive. For example, an index of a desired precoding matrix (Precoding Matrix Indicator: PMI) obtained from the channel state or the like may be used.

Figure 2:
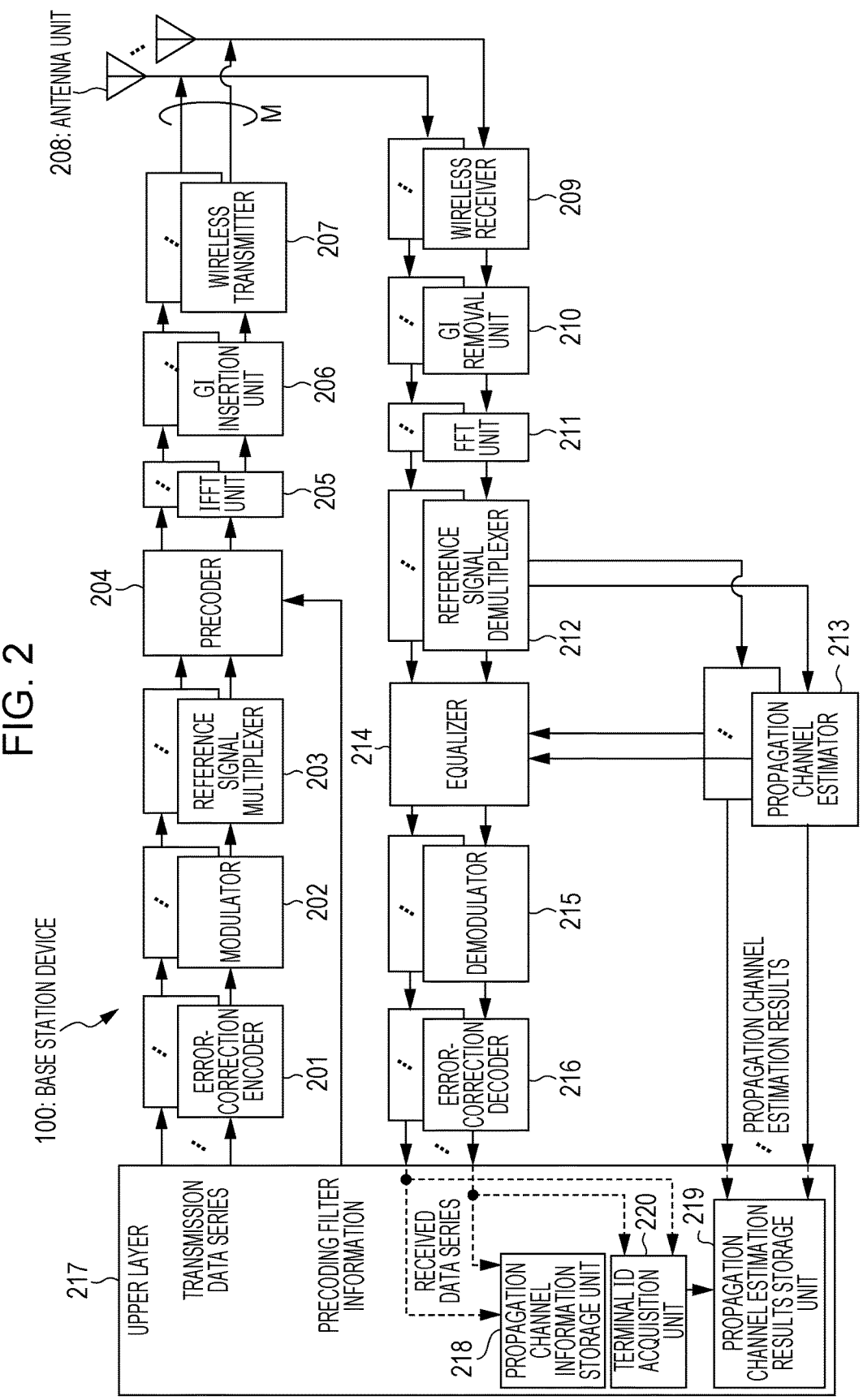
FIG. 2 is a functional block diagram illustrating a configuration example of a base station device 100 according to the present invention.

FIG. 2 is a functional block diagram illustrating a configuration example of the base station device 100 according to the present invention. The configuration of the base station device 100 in FIG. 2 has M antennas. Note that the base station device 100 in FIG. 2 corresponds to the base station device 100-1 and base station device 100-2 in FIG. 1.

The base station device 100 includes an error-correction encoder 201, a modulator 202, a reference signal multiplexer 203, a precoder 204, an IFFT unit 205, a GI insertion unit 206, a wireless transmitter 207, an antenna unit 208, a wireless receiver 209, a GI removal unit 210, an FFT unit 211, a reference signal demultiplexer 212, a propagation channel estimator 213, an equalizer 214, a demodulator 215, an error-correction decoder 216, and an upper layer 217.

The error-correction encoder 201 performs error-correction encoding on each of a maximum of M transmission data series, such as control data series, a maximum of M (M stream) terminal device 300 addressed user data series broadcast data series, multicast data series, and so forth, input from the upper layer 217, and generates an encoded series of transmission data. The error-correction encoder 201 may further perform bit puncturing (puncture, rate matching) according to specification for code rate from the upper layer 217 or the like. In a case where there is no specification for code rate, the error-correction encoder 201 may perform bit puncturing at a predetermined code rate. The error-correction encoder 201 may also perform interleaving on the encoded series of transmission data after bit puncturing.

The modulator 202 modulates each of the maximum of M encoded series of transmission data output from the error-correction encoder 201, and generates a modulated symbol series of transmission data. The modulator 202 preferably performs modulation following specification regarding a modulation scheme from the upper layer 217 or the like, and in a case where there is no specification of the modulation scheme, preferably performs modulation by a predetermined modulation scheme.

The reference signal multiplexer 203 multiplexes a symbol series of reference signals (pilot signals training signals preamble signals) on the modulated symbol sequence of transmission data output from the modulator 202. This reference signal symbol sequence is a symbol sequence of known symbols used by the terminal device 300 to estimate the propagation channel state between the antennas of the base station device 100 and the antenna of the terminal device 300 (in a case where the terminal device 300 has multiple antennas, the antennas). The reference signal symbol series is preferably multiplexed so that the reference signals transmitted from the antennas of the base station device 100 can be each separated and distinguished at the terminal device 300. For example, the reference signals symbol series may be multiplied on the transmission data series by time division, may be multiplexed by frequency division where dividing is performed by subcarrier, or may be multiplexed by code division. The reference signal multiplexer 203 may also further multiple a different reference signal symbol series for OFDM symbol synchronization or wireless frame synchronization or the like.

The precoder 204 performs precoding on the transmission data series on which the reference signal symbol series has been multiplexed, output from the reference signal multiplexer 203, based on the precoding filter information input from the upper layer 217, and generates a precoded symbol series which is transmitted from the antennas of the antenna unit 208. Although the present embodiment will be described regarding an example of a case where linear precoding is used as the precoding scheme, but nonlinear precoding may be used. Details of precoding will be described later.

The IFFT unit 205 performs frequency-to-time conversion, such as Inverse Fast Fourier Transform (IFFT) on the precoded symbol series for each antenna, output from the precoder 204, and converts into time domain signals.

The GI insertion unit 206 inserts guard intervals GI to the time domain signals output from the IFFT unit 205.

The wireless transmitter 207 converts the signals output from the GI insertion unit 206 into analog signals, upconverts into wireless signals, and transmits via the antenna unit 208.

The wireless receiver 209 downconverts the wireless signals received via the antenna unit 208 into baseband signals, converts into digital signals and outputs.

The GI removal unit 210 removes the guard intervals from the signals output from the wireless receiver 209.

The FFT unit 211 performs time-to-frequency conversion such as Fast Fourier Transform (FFT) on the signals from which the guard intervals have been removed, output from the GI removal unit 210, and outputs received symbol series for each antenna.

The reference signal demultiplexer 212 separates the reference signal symbol series from the received symbol series for each antenna, output from the FFT unit 211, inputs the separated reference signal symbol series into the propagation channel estimator 213, and inputs the modulated symbol series of the received data, which is the remaining received symbol series, into the equalizer 214.

The propagation channel estimator 213 estimates the state of the propagation channel between the each antenna of the transmitting device that transmitted the signal (terminal device 300 or a base station device 100 of a nearby cell) and each antenna of the base station device itself, and the reception quality, and outputs propagation channel state estimation results and reception quality estimation results.

The equalizer 214 equalizes (performs propagation channel compensation) the modulated symbol series of the received data output from the reference signal demultiplexer 212, based on propagation channel state estimation results output from the propagation channel estimator 213. In a case where the received signals are MIMO signals, the equalizer 214 performs MIMO signal detection based on the propagation channel state estimation results output from the propagation channel estimator 213.

The demodulator 215 performs demodulation processing on the post-equalization modulated symbol series of the received data output from the equalizer 214, and outputs an encoded series of received data. Note that the demodulator 215 preferably performs demodulation following specification regarding a demodulation scheme from the upper layer 217 or the like, and in a case where there is no specification of the demodulation scheme, preferably performs demodulation by a predetermined demodulation scheme.

The error-correction decoder 216 performs error-correction decoding on the encoded series of received data output from the demodulator 215, and outputs a received data series. In a case where bit puncturing has been performed at the transmission device, bit depuncturing (depuncture, rate matching) is performed on the encoded series of received data following specification of code rate from the upper layer 217 or the like before error-correction decoding. In a case where bit puncturing has been performed at the transmitting device and there is no specification for code rate, the error-correction decoder 216 preferably performs bit depuncturing at a predetermined code rate. In a case where interleaving has been performed at the transmission device, the error-correction decoder 216 performs deinterleaving on the encoded series of received data before error-correction decoding and bit depuncturing.

The upper layer 217 performs generation of transmission data series and generation of precoding filters. The upper layer 217 also performs processing of the received data series to acquire user data series, control data series, and propagation channel information notified by the terminal device 300 and so forth, and stores the acquired propagation channel information in the propagation channel information storage unit 218. The upper layer 217 also includes a terminal ID acquisition unit 220 that acquires and stores terminal IDs from the received data series of signals transmitted from the base station device 100 of a nearby cell and the terminal devices 300 of the nearby cell, specifying the terminal devices 300 which are the transmission sources of the signals or the transmission destinations of the signals. The upper layer 217 also stores propagation channel state estimation results and reception quality estimation results for between the terminal devices 300 of the nearby cell and the base station device 100 of the nearby cell, output from the propagation channel estimator 213, in a propagation channel estimation results storage unit 219. At the time of storing the propagation channel state estimation results and reception quality estimation results as to the terminal devices 300, the upper layer 217 also stores the terminal Id identifying the terminal devices 300 of this nearby cell, stored in the terminal ID acquisition unit 220, along therewith. The upper layer 217 further controls the operations of each of the above-described units.

Figure 3:
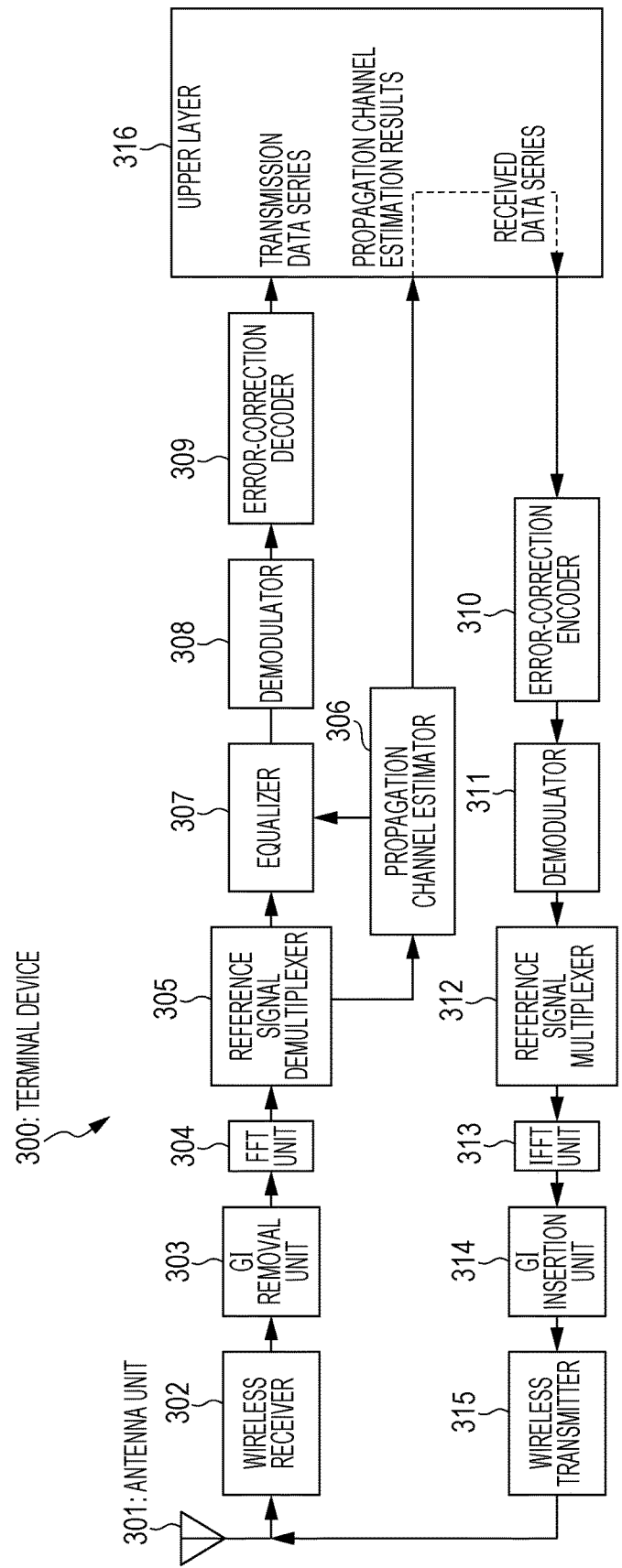
FIG. 3 is a functional block diagram illustrating a configuration example of a terminal device 300 according to the present invention.

FIG. 3 is a functional block diagram illustrating a configuration example of a terminal device 300 according to the present invention. The configuration example of the terminal device 300 has one antenna. Note that the terminal device 300 corresponds to the terminal device 300-1 through 300-6 in FIG. 1.

The terminal device 300 includes an antenna unit 301, a wireless receiver 302, a GI removal unit 303, an FFT unit 304, a reference signal demultiplexer 305, a propagation channel estimator 306, an equalizer 307, a demodulator 308, an error-correction decoder 309, an error-correction encoder 310, a modulator 311, a reference signal multiplexer 312, an IFFT unit 313, a GI insertion unit 314, a wireless transmitter 315, and an upper layer 316.

The wireless receiver 302 downconverts the wireless signals received via the antenna unit 301 into baseband signals, converts these into digital signals, and outputs.

The GI removal unit 303 removes guard intervals from the signals output from the wireless receiver 302.

The FFT unit 304 performs time-to-frequency conversion such as Fast Fourier Transform (FFT) on the signals from which the guard interval has been removed and output from the GI removal unit 303, and outputs received symbol series.

The reference signal demultiplexer 305 separates the reference signal symbol series from the received symbol series output from the FFT unit 304, inputs the separated reference signal symbol series into the propagation channel estimator 306, and inputs the modulated symbol series of the received data, which is the remaining received symbol series, into the equalizer 307.

The propagation channel estimator 306 estimates the propagation channel state between each antenna of the transmission device which has transmitted the signals (base station device 100) and the antenna of the terminal device itself, based on the reference signal symbol series output from the reference signal demultiplexer 305, and outputs propagation channel state estimation results.

The equalizer 307 equalizes (performs propagation channel compensation) the modulated symbol series of the received data output from the reference signal demultiplexer 305, based on propagation channel state estimation results output from the propagation channel estimator 306.

The demodulator 308 performs demodulation processing on the post-equalization modulated symbol series of the received data output from the equalizer 307, and outputs an encoded series of received data. Note that the demodulator 308 preferably performs demodulation following specification regarding a demodulation scheme from the upper layer 316 or the like, and in a case where there is no specification of the demodulation scheme, preferably performs demodulation by a predetermined demodulation scheme.

The error-correction decoder 309 performs error-correction decoding on the encoded series of received data output from the demodulator 308, and outputs a received data series. In a case where bit puncturing has been performed at the transmission device, bit depuncturing (depuncture, rate matching) is performed on the encoded series of received data following specification of code rate from the upper layer 316 or the like before error-correction decoding. In a case where bit puncturing has been performed at the transmitting device and there is no specification for code rate, the error-correction decoder 309 preferably performs bit depuncturing at a predetermined code rate. In a case where interleaving has been performed at the transmission device, the error-correction decoder 309 performs deinterleaving on the encoded series of received data before error-correction decoding and bit depuncturing.

The error-correction encoder 310 performs error-correction encoding on each of the transmission data series, such as control data series and base station device 100 addressed user data series broadcast data series, and so forth, input from the upper layer 316, and generates an encoded series of transmission data. The error-correction encoder 310 may further perform bit puncturing (puncture, rate matching) according to specification for code rate from the upper layer 316 or the like. In a case where there is no specification for code rate, the error-correction encoder 310 may perform bit puncturing at a predetermined code rate. The error-correction encoder 310 may also perform interleaving on the encoded series of transmission data after bit puncturing.

The modulator 311 modulates each of the encoded series of transmission data output from the error-correction encoder 310, and generates a modulated symbol series of transmission data. The modulator 311 preferably performs modulation following specification regarding a modulation scheme from the upper layer 316 or the like, and in a case where there is no specification of the modulation scheme, preferably performs modulation by a predetermined modulation scheme.

The reference signal multiplexer 312 multiplexes a symbol series of reference signals (pilot signals, training signals, preamble signals) on the modulated symbol sequence of transmission data output from the modulator 311. This reference signal symbol sequence is a symbol sequence of known symbols used by the base station device 100 to estimate the propagation channel state between the antenna of the terminal device 300 and the antennas of the base station device 100. The reference signal multiplexer 312 may also further multiplex a different reference signal symbol series for OFDM symbol synchronization or wireless frame synchronization or the like on the modulated symbol sequence of transmission data.

The IFFT unit 313 performs frequency-to-time conversion, such as Inverse Fast Fourier Transform (IFFT) on the modulated symbol sequence of transmission data series multiplexed with the reference signal symbol series output from the reference signal multiplexer 312, and converts into time domain signals.

The GI insertion unit 314 inserts guard intervals (GI) to the time domain signals output from the IFFT unit 313.

The wireless transmitter 315 converts the signals output from the GI insertion unit 314 into analog signals, upconverts into wireless signals, and transmits via the antenna unit 301.

The upper layer 316 performs generation of transmission data series, reconfiguration of received data series, processing of control data, generation of propagation channel information from the propagation channel state estimation results, and so forth, and further controls the operations of the above-described units.

Figure 4:
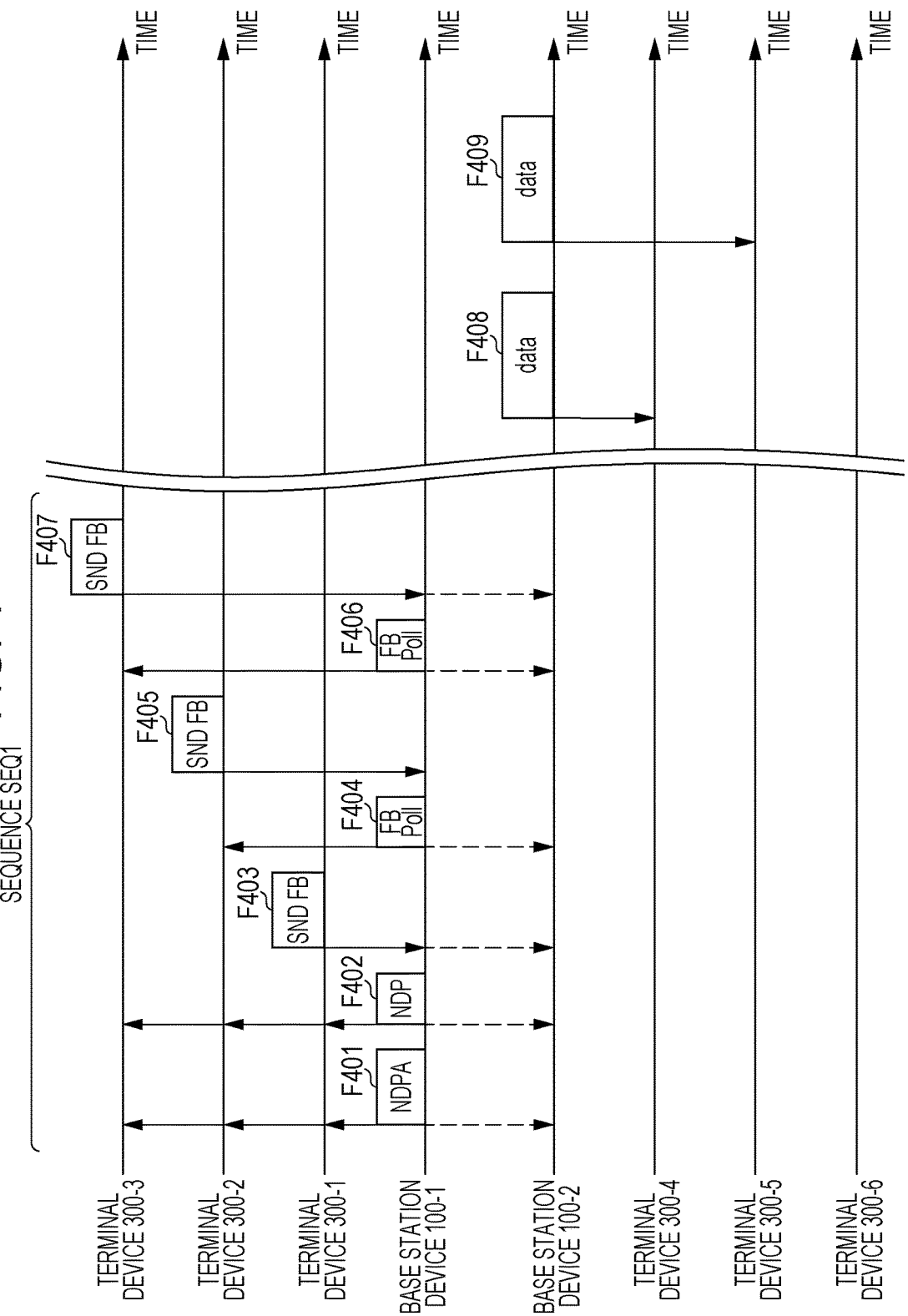
FIG. 4 is a time chart illustrating an example of transmission/reception of wireless frames among base station devices and terminal devices in a first embodiment of the present invention.

FIG. 4 is a time chart illustrating an example of transmission/reception of wireless frames among the base station device 100-1 (base station device of a nearby cell) and base station device 100-2 (base station device 100 of own cell), and terminal devices 300-1 through 300-3 (terminal devices of nearby cell) and terminal devices 300-4 through 300-6 (terminal devices of own cell), according to the present embodiment.

FIG. 4 illustrates an example of a case of the base station device 100-2 estimating the propagation channel state among the base station device 100-1 of the nearby cell and the terminal devices 300-1 through 300-3 of the nearby cell, by monitoring a series of a sequence (sequence SEQ1) initiated by the base station device 100-1 of the nearby cell, to request and collect propagation channel information from the terminal devices 300-1 through 300-3 belonging to this nearby cell. The base station device 100-2 performs precoding on the transmission signals to the terminal devices 300-4 through 300-6 belonging to its own cell based on the above-described propagation channel state, so that the signals do not reach the base station device 100-1 of the nearby cell and the terminal devices 300-1 through 300-3 of the nearby cell, and thereupon transmits the wireless signals.

In a case of performing MU-MIMO transmission to multiple terminal devices 300-1 through 300-3 within its own cell, the base station device 100-1 executes a propagation channel information request sequence such as the SEQ1 in FIG. 4, in order to know the state of the propagation channels between each of the antennas of the base station device 100-1 and the antennas of each of the terminal devices 300-1 through 300-3.

First, the base station device 100-1 (of the nearby cell) specifies one or more terminal devices for requesting notification of propagation channel information, when starting the propagation channel information request sequence, and transmits a frame for notifying these subject terminal devices regarding information such as the number of streams (MIMO ranks) of the information regarding which the terminal devices are to be requested to make notification, an NDPA (Null Data Packet Announcement) frame, for example (frame F401). An NDPA frame includes an identification No. (Association ID: AID) of a terminal device specified as a subject terminal device, a MAC (Media Access Control) address, or both of these information (hereinafter, these information will be collectively referred to as terminal ID). The NDPA frame specifies by terminal ID which of the subject terminal devices is to first notify (give feedback to) the base station device 100-1 on the propagation channel information. FIG. 4 illustrates an example of a case where the three terminal devices terminal devices 300-1 through 300-3 have been specified as subject terminal devices. The NDPA frame may further include a sequence No. to identify the propagation channel request sequence.

In the example of the wireless communication system illustrated in FIG. 1, the NDPA frame F401 which the base station device 100-1 has transmitted is also received by the base station device 100-2. The base station device 100-2 receives the NDPA frame F401, and acquires and stores the terminal ID of the subject terminal devices from which the base station device 100-1 is requesting notification of propagation channel information, and information (terminal ID) of the subject terminal device to feedback the propagation channel information to the base station device 100-1 first. Note that the base station device 100-2 may have a configuration of storing only the terminal ID of the subject terminal device to notify the propagation channel information to the base station device 100-1 first. The base station device 100-2 may further store the sequence No. included in the NDPA frame.

The base station device 100-1 then transmits a frame including a reference signal for each subject terminal device to estimate the propagation channel state between itself and the base station device 100-1 (sounding frame), an NDP (Null Data Packet) for example (frame F402). The NDP frame includes a reference signal transmitted for each of the antennas of the base station device 100-1. The subject terminal devices which have received the NDP frame estimate the state of the propagation channel between each antenna of the base station device 100-1 and one or more antennas itself based on the received signals of the reference signals, and generate propagation channel information representing the propagation channel state for the number of streams specified in the NDPA frame F401 received earlier.

The NDP frame F402 which the base station device 100-1 has transmitted is received at the base station device 100-2 as well, in the same way as with the NDPA frame F401. The base station device 100-2 receives the NDP frame F402, estimates the state of the propagation channel between the antennas of the base station device 100-1 and the antennas of itself and the reception quality, and stores the propagation channel state estimation results and reception quality estimation results. Note that reception quality preferably is estimation of received signal power, signal to noise power ratio (SNR), signal to interference plus noise power ratio (SINR), carrier to noise power ratio (CNR), carrier to interference plus noise power ratio (CINR), and so forth, but is not restricted to this. An example will be described below regarding a case where received signal power is estimated as reception quality. Further, the base station device 100-2 may store the sequence No. acquired from the above-described NDPA frame along with the propagation channel state estimation results and reception quality estimation results.

The subject terminal device specified to give feedback of the propagation channel information to the base station device 100-1 first in the NDPA frame F401, the terminal device 300-1 in the case in FIG. 4 for example, transmits a frame including propagation channel information generated based on the NDP frame F402, an SND FB (Sounding Feedback) frame for example, toward the base station device 100-1 (F403).

The base station device 100-1 receives the SND FB frame F403 transmitted from the terminal device 300-1, and acquires the propagation channel information notified from the terminal device 300-1.

In the example of the wireless communication system according to the present embodiment illustrated in FIG. 1, the SND FB frame F403 transmitted from the terminal device 300-1 is also received at the base station device 100-2. The base station device 100-2 receives the SND FB frame F403, and estimates the propagation channel state and reception quality between the antenna of the terminal device 300-1 and the antennas of itself, based on the reference signals included in the SND FB frame F403. The base station device 100-2 stores the propagation channel state estimation results and reception quality estimation results in the propagation channel estimation results storage unit 219, along with the terminal ID of the subject terminal device (terminal device 300-1) to give feedback of propagation channel information to the base station device 100-1 first, acquired from the NDPA frame F401. Note that the transmitter address (TA) included in the SND FB frame F403 may be acquired and used as a terminal ID. In a case where the propagation channel state estimation results and reception quality estimation results in the propagation channel estimation results storage have already been stored in the unit 219 along with the terminal ID, the stored contents are updated by the new estimation made this time (processing is performed in the same way in subsequent reception of SND FB frames as well). Further, the base station device 100-2 may store the sequence No. acquired form the NDPA frame along with the propagation channel state estimation results and reception quality estimation results.

The base station device 100-1 transmits a frame requesting feedback of propagation channel information, a FB Poll (Feedback Poll) frame for example, to the subject terminal device which is to give feedback of the propagation channel information next, the terminal device 300-2 in the case of FIG. 4 for example (frame F404).

The base station device 100-2 receives the FB Poll frame F404, and acquires the terminal ID of the subject terminal device (terminal device 300-2) from which the base station device 100-1 is requesting feedback of propagation channel information.

The terminal device 300-2 receives the FB Poll frame F404 from the base station device 100-1, and transmits an SND FB frame including the propagation channel information generated based on the NDP frame F402 toward the base station device 100-1 (frame F405).

The base station device 100-1 receives the SND FB frame F405 transmitted from the terminal device 300-2, and acquires the propagation channel information notified from the terminal device 300-2.

In the example of the wireless communication system according to the present embodiment illustrated in FIG. 1, the SND FB frame F405 transmitted from the terminal device 300-2 is not received at the base station device 100-2. Accordingly, in a case where the SND FB frame F405 is not received in a stipulated amount of time after the FB Poll frame F404 ending, the base station device 100-2 discards the terminal ID acquired from the FB Poll frame F404.

The base station device 100-1 transmits a FB Poll frame requesting feedback of propagation channel information to the subject terminal device which is to give feedback of the propagation channel information next, the terminal device 300-3 in the case of FIG. 4 for example (frame F406).

The base station device 100-2 receives the FB Poll frame F406, and acquires the terminal ID of the subject terminal device (terminal device 300-3) from which the base station device 100-1 is requesting feedback of propagation channel information.

The terminal device 300-3 receives the FB Poll frame F406 from the base station device 100-1, and transmits an SND FB frame including the propagation channel information generated based on the NDP frame F402 toward the base station device 100-1 (frame F407).

The base station device 100-1 receives the SND FB frame F407 transmitted from the terminal device 300-3, and acquires the propagation channel information notified from the terminal device 300-3.

In the example of the wireless communication system according to the present embodiment illustrated in FIG. 1, the SND FB frame F407 transmitted from the terminal device 300-3 is received at the base station device 100-2 as well. The base station device 100-2 receives the SND FB frame F407, and estimates the propagation channel state and reception quality between the antenna of the terminal device 300-3 and the antennas of itself, based on the reference signals included in the SND FB frame F407. The base station device 100-2 stores the propagation channel state estimation results and reception quality estimation results in the propagation channel estimation results storage unit 219, along with the terminal ID acquired from the FB Poll frame F406. Note that the transmitter address included in the SND FB frame F407 may be acquired and used as a terminal ID. Further, the base station device 100-2 may store the sequence No. acquired from the NDPA frame along with the propagation channel state estimation results and reception quality estimation results.

As a result of the above, the base station device 100-2 is in a state of having stored, in the propagation channel estimation results storage unit 219, the propagation channel state estimation results and reception quality estimation results between itself and the base station device 100-1, and the propagation channel state estimation results and reception quality estimation results between itself and the terminal device 300-1 and terminal device 300-3, corresponding to terminal ID. The base station device 100-2 may further store the sequence No. in a correlated manner.

The base station device 100-2 subjects transmission data addressed to the terminal device 300-4 of its own cell to precoding, based on the stored propagation channel state estimation results as to the base station device 100-1, terminal device 300-1, and terminal device 300-3, and transmitted, so that nulls are directed toward these (frame F408).

The terminal device 300-4 receives the frame F408.

In the same way, the base station device 100-2 subjects transmission data addressed to the terminal device 300-5 of its own cell to precoding, based on the propagation channel state estimation results as to the base station device 100-1, terminal device 300-1, and terminal device 300-3, stored in the propagation channel estimation results storage unit 219, and transmitted, so that nulls are directed toward these (frame F409).

The terminal device 300-5 receives the frame F409.

While an example has been illustrated in FIG. 4 where the base station device 100-2 performs precoding at the time of transmitting data to a terminal device in its own cell, with nulls directed so that the transmission signals do not reach all of the base station device 100-1, terminal device 300-1, and terminal device 300-3, in the nearby cell, which the base station device 100-2 has been able to receive, this is not restrictive.

For example, nulls exceeding the degrees of freedom of the antenna cannot be generated, so the base station device 100-2 may select as many base station devices and terminal devices in nearby cells as the number of degrees of freedom of the antenna, in order of high reception quality estimation results (high received signal power) stored in the propagation channel estimation results storage unit 219, and perform precoding so that nulls are directed toward the selected base station devices and terminal devices in nearby cells. Selecting the destination for directing nulls in the order of high reception quality estimation results enables nulls to be directed with higher priority toward base station devices and terminal devices in nearby cells regarding which there is a possibility that signals transmitted by the base station device 100-2 might be strongly received, so inter-cell interference as to nearby cells can be effectively suppressed.

As another example, the base station device 100-2 may select as many base station devices and terminal devices in nearby cells as the number of degrees of freedom of the antenna, in order of newness of sequence No. of the propagation channel information request sequences stored in the propagation channel estimation results storage unit 219, and perform precoding so that nulls are directed toward the selected base station devices and terminal devices in nearby cells. Selecting the destination for directing nulls in the order of new sequence No. enables nulls to be directed with higher priority toward base station devices and terminal devices in nearby cells regarding which there is a higher possibility that communication is being performed, so inter-cell interference as to nearby cells can be effectively suppressed.

Also, the above two examples may be combined, and the base station device 100-2 may select as many base station devices and terminal devices in nearby cells as the number of degrees of freedom of the antenna, in order of high reception quality estimation results (high received signal power) and in order of newness of sequence No. of the propagation channel information request sequences, stored in the propagation channel estimation results storage unit 219, and perform precoding so that nulls are directed toward the selected base station devices and terminal devices in nearby cells. This enables nulls to be directed with higher priority toward base station devices and terminal devices in nearby cells regarding which there is a possibility that signals transmitted by the base station device 100-2 might be strongly received, and regarding which there is a higher possibility that communication is being performed, so inter-cell interference as to nearby cells can be effectively suppressed.

While a case has been described above where one base station device 100-2 performs precoding so that nulls are directed toward the base station device 100-1 and terminal devices 300-1 through 300-3 of a nearby cell, the base station device 100-1 may similarly estimate the state of propagation channels as to the base station device 100-2 and terminal devices 300-4 through 300-6 of the nearby cell thereof, and perform precoding to direct nulls thereto.

Figure 5:
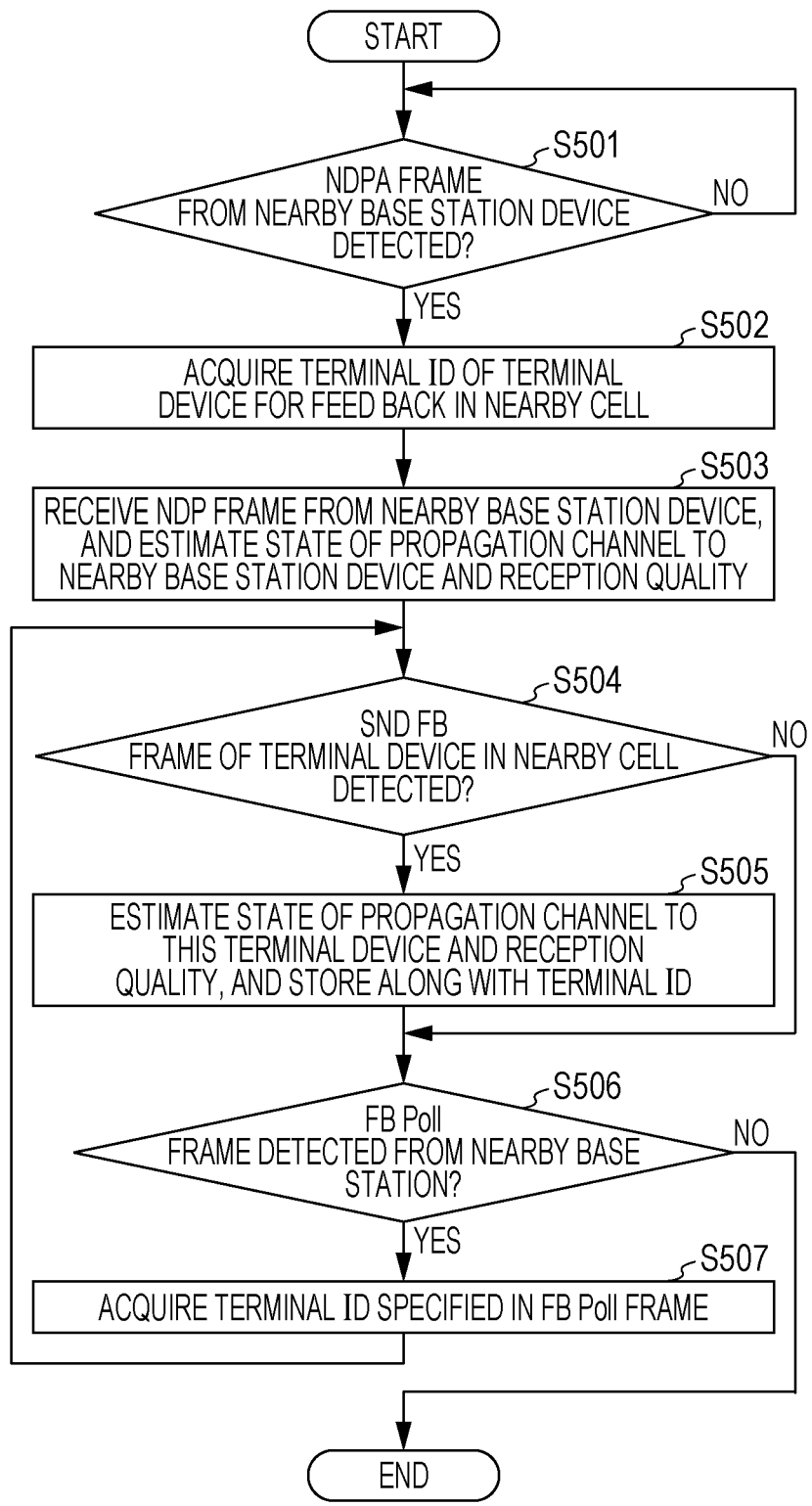
FIG. 5 is a flowchart illustrating an example of the flow of processing for a base station to estimate propagation channel states among base station devices and terminal devices in nearby cells, in the first embodiment of the present invention.

FIG. 5 is a flowchart illustrating an example of the flow of processing for the base station 100 according to the present embodiment to estimate propagation channel states among base station devices and terminal devices in nearby cells, in the above-described sequence SEQ1.

In a case of having detected an NDPA frame transmitted from a base station device of a nearby cell (Yes in step S501), the base station device 100 receives this and advances to step S502. In a case where no NDPA frame is detected (No in step S501), the flow returns to step S501.

The base station device 100 acquires the terminal ID of the subject terminal devices regarding which the base station device of the nearby cell is requesting feedback of propagation channel information, and the terminal ID of the subject terminal device specified to give feedback first, from the received NDPA frame transmitted from the base station device of the nearby cell (step S502).

The base station device 100 receives an NDP frame transmitted from the base station device of the nearby cell, and estimates the state of the propagation channel between the base station device of the nearby cell and itself, and the reception quality, based on reference signals included in the received NDP frame (step S503).

In a case of having detected an SND FB frame transmitted from a terminal device of the nearby cell (Yes in step S504), the base station device 100 receives this and advances to step S505. In a case where no SND FB frame has been detected in a stipulated amount of time (No in step S504), the flow advances to step S506.

The base station device 100 estimates the state of the propagation channel between the terminal device of the nearby cell and itself, and the reception quality, based on reference signals included in the received SND FB frame transmitted from the terminal device of the nearby cell. In a case where the SND FB frame immediately follows the NDP frame, the propagation channel state estimation results and reception quality estimation results are stored along with the terminal ID of the subject terminal device specified to give feedback first, specified in the NDPA frame. Also, in a case where an FB Poll frame is detected in the later-described step S506, and an SND FB frame immediately follows acquisition of the terminal ID in step S507, propagation channel state estimation results and reception quality estimation results are stored along with the terminal ID acquired from the FB Poll frame (step S505).

In a case of having detected an FB Poll frame transmitted from the base station device of the nearby cell (Yes in step S506), the base station device 100 receives this and advances to step S507. In a case where no FB Poll frame is detected (No in step S506), the flow ends.

The base station device 100 acquires the terminal ID of the subject terminal device regarding which the base station device of the nearby cell is requesting feedback on propagation channel information, based on the received FB Poll frame transmitted from the base station device of the nearby cell, and returns to step S504 (step S507).

Based on the above-described flow, the base station device 100 monitors a series of a sequence initiated by the base station device of the nearby cell, to request and collect propagation channel information from the terminal devices belonging to this nearby cell, thereby enabling the state of the propagation channels between the base station device and the terminal devices of the nearby cell and itself to be efficiently estimated.

Note that estimation of the state of the propagation channels between the base station device and the terminal devices of the nearby cell and itself is not restricted to a method based on observation of the sequence described above. Estimation of the state of the propagation channels between the base station device and the terminal devices of the nearby cell and itself may be performed by the base station device 100 individually observing various types of frames communicated among the base station device and the terminal devices of the nearby cell. In this case, the terminal ID of the terminal devices of the nearby cell may be acquired from the transmitter address included in each frame.

FIG. 6 is a flowchart illustrating an example of the flow of transmission processing at the time of the base station device 100 according to the present embodiment transmitting data to a terminal device of its own cell.

The base station device 100 selects a terminal device to transmit data to, from the terminal devices in its own cell, based on the state of data storage within the transmission buffer, QoS (Quality of Service) information of transmission data, and so forth (step S601).

The base station device 100 selects base station devices and terminal devices of nearby cells of which the propagation channel state estimation results are stored, the upper limit of the number thereof being the same as the number of antenna degrees of freedom of itself (step S602). At this time, the base station device 100 preferably selects the base station devices and terminal devices of nearby cells based on the order of highest stored reception quality estimation results (highest received signal power), order of newest sequence No. of stored propagation channel information request sequences, or a combination thereof, but this is not restrictive. Also, the base station device 100 may group multiple terminal devices of nearby cells regarding which correlation of propagation channels is determined to be strong, from the propagation channel state estimation results, and one terminal device may be representatively selected from each group. At this time, the antenna degrees of freedom need only to be a number equivalent to the nulls directed to the selected representative terminal devices, so as a result of the later-described precoding, nulls can be directed to almost all terminal devices within each of the groups to which the selected representative terminal devices belong.

The base station device 100 calculates a precoding filter where nulls are directed to the selected base station devices and terminal devices of the nearby cells, based on the stored propagation channel state estimation results of the selected base station devices and terminal devices of the nearby cells (step S603).

The base station device 100 multiples the transmission data addressed to the terminal device of the own cell selected in step S601 by the precoding filter calculated in step S603, and generates and transmits transmission signals (step S604). The reference signals and control information included in the frame transmitted at this time may also be multiplied by the above-described precoding filter to perform precoding.

As described above, the base station devices according to the present embodiment can autonomously perform precoding to suppress inter-cell interference which affects nearby cells, which enables improvement in throughput in an OBSS environment where part or all of cells configured by multiple base station devices overlap.

(Second Embodiment)

The wireless communication system according to the present embodiment will also be described as an example in FIG. 1 where, in the same way as the first embodiment, where there are two base stations which are base station device 100-1 and base station device 100-2 and terminal device 300-1, terminal device 300-2, and terminal device 300-3 connected to the base station device 100-1, and terminal device 300-4, terminal device 300-5, and terminal device 300-6 connected to the base station device 100-2.

The configurations of the base station devices 100 and terminal devices 300 according to the present embodiment are the same as in FIG. 2 and FIG. 3 in the first embodiment, but differ with regard to the point that the base station device 100-2 performs precoding further using propagation channel information acquired from acquired from terminal devices of its own cell, when transmitting data to the terminal devices of its own cell. Hereinafter, portions which are the same as the first embodiment will be omitted from description, and just portions which are different will be described.

FIG. 7 is a time chart illustrating an example of transmission/reception of wireless frames among the base station device 100-1 (base station device of nearby cell) and the base station device 100-2 (base station device of own cell) according to the present embodiment, and terminal devices 300-1 through 300-3 (terminal devices of nearby cell) and terminal devices 300-4 through 300-6 (terminal devices of own cell). FIG. 7 illustrates an example of a case where the base station device 100-2 transmits each transmission data addressed to the terminal devices 300-4 through 300-6 by spatial multiplexing using MU-MIMO.

In FIG. 7, first, a series of the propagation channel information request sequence is initiated by the base station device 100-1 of the nearby cell, to request and collect propagation channel information from the terminal devices 300-1 through 300-3 belonging to this nearby cell, in the same way as in the sequence SEQ1 in FIG. 4. As a result, the base station device 100-2 is in a state of having stored, in the propagation channel estimation results storage unit 219, the propagation channel state estimation results and reception quality estimation results between itself and the base station device 100-1, and the propagation channel state estimation results and reception quality estimation results between itself and the terminal device 300-1 and terminal device 300-3, corresponding to terminal ID. The base station device 100-2 may further store the sequence No. in a correlated manner.

Next, a series of a propagation channel information request sequence (sequence SEQ2) is initiated and executed by the base station device 100-2, to request and collect propagation channel information from the terminal devices 300-4 through 300-6 belonging to this cell.

When starting the propagation channel information request sequence, the base station device 100-2 specifies the multiple terminal devices regarding which notification of propagation channel information is requested as subject terminal devices, and transmits a frame for notifying these subject terminal devices regarding notification information such as the number of streams (number of MIMO ranks) of the propagation channel information regarding which the terminal devices are to be requested to make notification, an NDPA frame for example (frame F701). FIG. 7 illustrates an example of a case where the three terminal devices of the terminal devices 300-4 through 300-6 have been specified as subject terminal devices.

The base station device 100-2 transmits a frame including reference signals for each subject terminal device to estimate the state of the propagation channel between itself and the base station device 100-2, an NDP frame for example (frame F702). An NDP frame includes reference signals transmitted from each of the antennas of the base station device 100-2, whereby the state of the propagation channel between the antennas of the base station device 100-2 and one or more antennas of the terminal device itself is estimated based on the received signals of the reference signals by the subject terminal devices which have received the NDP frame 702, and propagation channel information representing the state of the propagation channel of a number equivalent to the number of streams specified in the already-received NDPA frame F701 is generated.

The subject terminal device which has been specified in the NDPA frame F701 to give feedback to the base station device 100-2 of the propagation channel information first, the terminal device 300-4 for example in the case of FIG. 7, transmits a frame including the propagation channel information generated based on the NDP frame F702, an SND FB frame for example, toward the base station device 100-2 (frame F703).

The base station device 100-2 receives the SND FB frame F703 transmitted from the terminal device 300-4, acquires the propagation channel information notified from the terminal device 300-4, and stores this in the propagation channel information storage unit 218.

The base station device 100-2 transmits a frame requesting feedback of propagation channel information, an FB Poll frame for example, to the terminal device to give feedback on propagation channel information next, the terminal device 300-5 for example in the case of FIG. 7 (frame F704).

The terminal device 300-5 receives the FB Poll frame F704 from the base station device 100-2, and transmits an SND FB frame including the propagation channel information generated based on the NDP frame F702 toward the base station device 100-2 (frame F705).

The base station device 100-2 receives the SND FB frame F705 transmitted from the terminal device 300-5, acquires the propagation channel information notified from the terminal device 300-5, and stores this in the propagation channel information storage unit 218.

The base station device 100-2 transmits an FB Poll frame requesting feedback of propagation channel information, to the terminal device to give feedback on propagation channel information next, the terminal device 300-6 for example in the case of FIG. 7 (frame F706).

The terminal device 300-6 receives the FB Poll frame F706 from the base station device 100-2, and transmits an SND FB frame including the propagation channel information generated based on the NDP frame F702 toward the base station device 100-2 (frame F707).

The base station device 100-2 receives the SND FB frame F707 transmitted from the terminal device 300-6, acquires the propagation channel information notified from the terminal device 300-6, and stores this in the propagation channel information storage unit 218.

As a result of the above, the base station device 100-2 is a state of having stored propagation channel information fed back from the terminal device 300-4 through terminal device 300-6 in the propagation channel information storage unit 218.

The base station device 100-2 performs precoding on each transmission data addressed to the terminal devices 300-4 through 300-6 so that nulls are directed toward the base station device 100-1 and terminal devices 300-1 through 300-3 and signals are received at the terminal devices 300-4 through 300-6 with inter-user interference suppressed, based on the propagation channel information fed back from each of the terminal devices 300-4 through 300-6, stored in the propagation channel information storage unit 218, and the propagation channel state estimation results among the base station device 100-1 and the terminal devices 300-1 through 300-3, stored in the propagation channel estimation results storage unit 219, and transmits MU-MIMO signals (frame F708).

The terminal devices 300-4 through 300-6 each receive the frame F708.

While the base station device 100-2 has been described in the example in FIG. 7 as performing precoding on the transmission signals to the terminal devices in its own cell by spatial multiplexing of data by MU-MIMO, so that the signals do not reach all of the base station device 100-1 and terminal device 300-1 and terminal device 300-3 of the nearby cell regarding which the base station device 100-2 was able to receive signals, this is not restrictive.

For example, nulls exceeding the degrees of freedom of the antenna cannot be generated, so the base station device 100-2 may select a number of base station devices and terminal devices in nearby cells which is a number equal to the number of excess degrees of freedom of the antenna after having subtracted therefrom the degrees of freedom necessary for suppressing inter-user interference when spatially multiplexing data by MU-MIMO and transmitting to multiple terminal devices in its own cell, in order of high reception quality estimation results (high received signal power) stored in the propagation channel estimation results storage unit 219, and perform precoding so that nulls are directed toward the selected base station devices and terminal devices in nearby cells. Selecting the destination for directing nulls in the order of high reception quality estimation results enables nulls to be directed with higher priority toward base station devices and terminal devices in nearby cells regarding which there is a possibility that signals transmitted by the base station device 100-2 might be strongly received, so inter-cell interference as to nearby cells can be effectively suppressed.

As another example, the base station device 100-2 may select as many base station devices and terminal devices in nearby cells as the excess number of degrees of freedom of the antenna, in order of newness of sequence No. of the propagation channel information request sequences stored in the propagation channel estimation results storage unit 219, and perform precoding so that nulls are directed toward the selected base station devices and terminal devices in nearby cells. Selecting the destination for directing nulls in the order of new sequence No. enables nulls to be directed with higher priority toward base station devices and terminal devices in nearby cells regarding which there is a higher possibility that communication is being performed, so inter-cell interference as to nearby cells can be effectively suppressed.

Also, the above two examples may be combined, and the base station device 100-2 may select as many base station devices and terminal devices in nearby cells as the excess number of degrees of freedom of the antenna, in order of high reception quality estimation results (high received signal power) and in order of newness of sequence No. of the propagation channel information request sequences, stored in the propagation channel estimation results storage unit 219, and perform precoding so that nulls are directed toward the selected base station devices and terminal devices in nearby cells. This enables nulls to be directed with higher priority toward base station devices and terminal devices in nearby cells regarding which there is a possibility that signals transmitted by the base station device 100-2 might be strongly received, and regarding which there is a higher possibility that communication is being performed, so inter-cell interference as to nearby cells can be effectively suppressed.

While a case has been described above where one base station device 100-2 performs precoding so that nulls are directed toward the base station device 100-1 and terminal devices 300-1 through 300-3 of a nearby cell when spatially multiplexing data by MU-MIMO and transmitting to multiple terminal device in its own cell, the base station device 100-1 may similarly estimate the state of propagation channels as to the base station device 100-2 and terminal devices 300-4 through 300-6 of the nearby cell thereof, and perform precoding to direct nulls to the base station device 100-2 and terminal devices 300-4 through 300-6 of the nearby cell while suppressing inter-user interference, when spatially multiplexing data by MU-MIMO and transmitting to multiple terminal device in its own cell.

FIG. 8 is a flowchart illustrating an example of the flow of transmission processing for a base station according to the present embodiment to transmit data to terminal devices in its own cell.

The base station device 100 selects multiple terminal devices to transmit data to from the terminal devices in its own cell, based on the state of data storage within the transmission buffer, QoS (Quality of Service) information of transmission data, and so forth (step S801).

The base station device 100 transmits a sounding frame to the multiple terminal devices selected in step S801, to estimate the state of the propagation channel between the antennas of itself and one or more antennas of the terminal devices, and acquires feedback of propagation channel information based on the estimation results of the propagation channel state from each of the terminal devices (step S802).

The base station device 100 selects base station devices and terminal devices of nearby cells of which the propagation channel state estimation results are stored, the upper limit of the number thereof being the same as the number of excess degrees of freedom of the antenna after having subtracted therefrom the antenna degrees of freedom necessary for suppressing inter-user interference when spatially multiplexing data by MU-MIMO and transmitting to multiple terminal device in its own cell (step S803). At this time, the base station device 100 preferably selects the base station devices and terminal devices of nearby cells based on the order of highest stored reception quality estimation results (highest received signal power), order of newest sequence No. of stored propagation channel information request sequences, or a combination thereof, but this is not restrictive. Also, the base station device 100 may group multiple terminal devices of nearby cells regarding which correlation of propagation channels is determined to be strong from the propagation channel state estimation results, and one terminal device may be representatively selected from each group. At this time, the antenna degrees of freedom need only to be a number equivalent to the nulls directed to the selected representative terminal devices, so as a result of the later-described precoding, nulls can be directed to almost all terminal devices within each of the groups to which the selected representative terminal devices belong.

The base station device 100 calculates a precoding filter where nulls are directed to the base station devices and terminal devices of the nearby cells, and inter-user interference is suppressed in signal reception among the multiple terminal devices in its own cell, based on the propagation channel information fed back from each terminal device in its own cell and the propagation channel state estimation results of the base station devices and terminal devices of the nearby cells (step S804).

The base station device 100 multiples the transmission data addressed to the multiple terminal devices of its own cell selected in step S801 by the precoding filter calculated in step S804, and generates and transmits transmission signals (step S805). The reference signals and control information included in the frame transmitted at this time may also be multiplied by the above-described precoding filter to perform precoding.

As described above, the base station devices according to the present embodiment can autonomously perform precoding to suppress inter-cell interference which affects nearby cells at the time of performing spatial multiplexing of data by MU-MIMO and transmitting to the multiple terminal devices in its own cell, which enables improvement in throughput in an OBSS environment where part or all of cells configured by multiple base station devices overlap.

Although the frame transmission timing, OFDM symbol timing, and so forth, between the base station device 100-1 and base station device 100-2 are assumed to be asynchronous in the above-described embodiments, this is not restrictive. For example, at the time of receiving a frame which the base station device 100-1 of a nearby cell has transmitted, an NDPA frame F401 or NDP frame F402 for example, the base station device 100-2 may adjust the frame transmission timing and OFDM symbol timing when transmitting a frame from itself based on the timing of the OFDM symbols of the received frames, so that the timing thereof is synchronized with the base station device 100-1.

Also, a case is assumed in the above-described embodiments where precoding filters are calculated based on the propagation channel state estimation results for each OFDM subcarrier, this is not restrictive. An arrangement may be made where multiple subcarriers are brought together (grouped) into a sub-band, with precoding filters being calculated for each sub-band. Further, one sub-band may be configured from all subcarriers of the OFDM band. In a case where one sub-band is configured from all subcarriers, no timing synchronization is needed among the base station devices.

Although embodiments of the present invention have been described in detail with reference to the drawings, specific configurations are not restricted to these embodiments, and designs and the like which do not depart from the essence of the invention are also encompassed by the scope of the Claims.

The present invention is not restricted to the above-described embodiments. The terminal device 300 according to the present invention is not restricted to application to terminal devices in a wireless LAN system or the like, and it is needless to say that application thereof includes stationary or non-portable electronic devices installed indoors or outdoors, such as audio and visual devices, kitchen devices, cleaning/laundry devices, air conditioning devices, office devices, automatic vending devices, other daily use devices, and so forth.

A program which runs on the base station device 100 and terminal device 300 according to the present invention is a program which controls a CPU or the like (a program which causes a computer to function), so as to realize the functions of the above-described embodiments according to the present invention. Information handled by these devices are temporarily stored in RAM at the time of processing, thereafter stored in various types of ROM and HDDs, read out by the CPU, and edited/written as necessary. A storage medium for storing the program may be any of semiconductor media (e.g., ROM, nonvolatile memory card, etc.), optical recording media (e.g., DVD, MO, MD, CD, BD, etc.), magnetic recording media (e.g., magnetic tape, flexible disk, etc.) and so forth. There are cases where the functions of the present invention are realized by processing being performed in collaboration with an operating system or another application program or the like, based on the instructions of this program, not only the functions of the above-described embodiments being realized by executing the loaded program.

In a case of distributing on the market, the program may be stored in a portable recording medium and distributed, or transferred to a server computer connected via a network such as the Internet or the like. At this time, the storage device of the server computer is also encompassed by the present invention. Also, part or all of the base station device 100 and terminal device 300 according to the above-described embodiments may be realized as an LSI, typically an integrated circuit. The functional blocks of the base station device 100 and the terminal device 300 may be individually formed into a processor, or part or all may be integrated and formed into a processor. The technique of forming into an integrated circuit is not restricted to LSIs, and may be realized by dedicated circuits or general-purpose processors. In the event of the advent of an integrated circuit technology replacing LSI due to advance in semiconductor technology, integrated circuits according to this technology may also be used.

[In Conclusion]

(1) To achieve the above object, the following means were implemented in the present invention. That is to say, a base station device according to the present invention includes: a wireless receiver that receives first wireless frames, which are wireless frames transmitted by a terminal device of a nearby cell; a propagation channel estimator that estimates the state of a propagation channel between the terminal device of the nearby cell and an own base station device, based on received signals of the first wireless frame; a precoder that performs precoding on transmission data addressed to a terminal device in an own cell, based on estimation results of the state of the propagation channel; and a wireless transmitter that transmits transmission data subjected to the precoding.

(2) The base station device according to the present invention further includes: a terminal ID acquisition unit that acquires, from the first wireless frame, a terminal ID to identify the terminal device of the nearby cell; and a propagation channel estimation results storage unit that stores estimation results of the state of the propagation channel, wherein the propagation channel estimation results storage unit stores the estimation results of the state of the propagation channel in a manner correlated with the acquired terminal ID, and wherein the precoder performs precoding on transmission data addressed to a terminal device of the own cell, based on at least one or more estimation results of the state of the propagation channel selected from the propagation channel estimation results storage unit.

(3) In the base station device according to the present invention, the wireless receiver further receives a second wireless frame, which is a wireless frame transmitted by a base station device of a nearby cell, and the terminal ID acquisition unit acquires a terminal ID identifying the terminal device of the nearby cell, from at least one of the first wireless frame and the second wireless frame.

(4) In the base station device according to the present invention, the precoder selects one or more of the estimation results of the state of the propagation channel, in newest order, from the propagation channel estimation results storage unit.

(5) In the base station device according to the present invention, the propagation channel estimator further estimates reception quality of the first wireless frame, the propagation channel estimation results storage unit stores the estimation results of the state of the propagation channel and the estimation results of the reception quality, in a manner correlated with the acquired terminal ID, and the precoder selects one or more of the estimation results of the state of the propagation channel, from the propagation channel estimation results storage unit, based on the estimation results of the reception quality relating to one or more terminal devices of the nearby cell, stored in the propagation channel estimation results storage unit.

(6) In the base station device according to the present invention, the precoder selects one or more of the estimation results of the state of the propagation channel, from the propagation channel estimation results storage unit, in highest order of estimation results of the reception quality relating to one or more terminal devices of the nearby cell, stored in the propagation channel estimation results storage unit.

(7) In the base station device according to the present invention, the precoder selects estimation results of the state of propagation channels as to one or more of the terminal devices in the nearby cell, from the propagation channel estimation results storage unit, the upper limit of the number thereof being the same as the number of antenna degrees of freedom of the own base station device.

(8) In the base station device according to the present invention, the precoder performs precoding on transmission data addressed to a terminal device of the own cell so that a null is directed toward a corresponding terminal device of the nearby cell, based on the one or more estimation results of the state of the propagation channel selected from the propagation channel estimation results storage unit.

(9) The base station device according to the present invention, further includes: a propagation channel information storage unit that stores propagation channel information based on the state of the propagation channel between the own base station device and a terminal device of the own cell, notified from the terminal device of the own cell. The wireless receiver further receives a third wireless frame, which is a wireless frame including the propagation channel information notified from the terminal device of the own cell, and the precoder performs precoding on transmission data addressed to one or more terminal devices of the own cell, based on propagation channel information notified from the one or more terminal devices of the own cell stored in the propagation channel information storage unit, and on the estimation results of the state of the propagation channels as to the one or more terminal devices of the nearby cell selected from the propagation channel estimation results storage unit.

(10) In the base station device according to the present invention, the precoder selects estimation results of the state of propagation channels as to one or more of the terminal devices in the nearby cell, from the propagation channel estimation results storage unit, the upper limit of the number thereof being the same as an excess number of antenna degrees of freedoms of the own base station device, obtained by subtracting the antenna degrees of freedom necessary to transmit transmission data addressed to the one or more terminal devices of the own cell.

(11) In the base station device according to the present invention, the precoder suppresses inter-user interference at the time of spatially multiplexing and simultaneously transmitting transmission data addressed to a plurality of terminal devices of the own cell, based on propagation channel information notified from the plurality of terminal devices of the own cell, stored in the propagation channel information storage unit, and also performs precoding on transmission data addressed to the plurality of terminal devices of the own cell so that a null is directed toward a corresponding terminal device of the nearby cell, based on the one or more estimation results of the state of the propagation channel selected from the propagation channel estimation results storage unit.

(12) A wireless communication system according to the present invention is configured including a base station device and a terminal device. The base station device receives wireless frames transmitted by a terminal device of a nearby cell, estimates the state of a propagation channel between the terminal device of the nearby cell and the own base station device, based on received signals of the wireless frame, and performs precoding on transmission data addressed to the terminal device of an own cell and transmits, so that a null is directed toward a corresponding terminal device of the nearby cell, based on estimation results of the state of the propagation channel.

(13) A wireless communication system according to the present invention is configured including a base station device and a terminal device. The base station device receives wireless frames transmitted by a terminal device of a nearby cell, estimates the state of a propagation channel between the terminal device of the nearby cell and the own base station device, based on received signals of the wireless frame, and suppresses inter-user interference at the time of spatially multiplexing and simultaneously transmitting transmission data addressed to one or more terminal devices of the an own cell, based on propagation channel information notified from the one or more terminal devices of the own cell and the estimation results of the state of the propagation channel, and also performs precoding on transmission data addressed to the one or more terminal devices of the own cell so that a null is directed toward a terminal device of the nearby cell corresponding to estimation results of the state of the propagation channel, and transmits the precoded data.

(14) A wireless communication method according to the present invention is a wireless communication method for performing communication between a base station device and a terminal device. The base station device includes a step of receiving wireless frames transmitted by a terminal device of a nearby cell, a step of estimating the state of a propagation channel between the terminal device of the nearby cell and the own base station device, based on received signals of the wireless frame, a step of performing precoding on transmission data addressed to the terminal device of an own cell, so that a null is directed toward a corresponding terminal device of the nearby cell, based on estimation results of the state of the propagation channel, and a step of transmitting the signals subjected to the precoding.

(15) A wireless communication method according to the present invention is a wireless communication method for performing communication between a base station device and a terminal device. The base station device includes a step of receiving wireless frames transmitted by a terminal device of a nearby cell, a step of estimating the state of a propagation channel between the terminal device of the nearby cell and the own base station device, based on received signals of the wireless frame, a step of receiving propagation channel information notified from the terminal device of an own cell, based on the state of the propagation channel between the own base station device and the terminal device, a step of suppressing inter-user interference at the time of spatially multiplexing and simultaneously transmitting transmission data addressed to one or more terminal devices of the own cell, based on propagation channel information notified from the one or more terminal devices of the own cell and the estimation results of the state of the propagation channel, and also performing precoding on transmission data addressed to the one or more terminal devices of the own cell so that a null is directed toward a terminal device of the nearby cell corresponding to estimation results of the state of the propagation channel, and a step of transmitting the signals subjected to the precoding.

(16) An integrated circuit according to the present invention causes a base station device to exhibit a plurality of functions, by being installed in the base station device. The integrated circuit causes the base station device to exhibit a series of functions of a function of receiving wireless frames transmitted by a terminal device of a nearby cell, a function of estimating the state of a propagation channel between the terminal device of the nearby cell and the own base station device, based on received signals of the wireless frame, a function of performing precoding on transmission data addressed to the terminal device of an own cell, so that a null is directed toward a corresponding terminal device of the nearby cell, based on estimation results of the state of the propagation channel, and a function of transmitting the signals subjected to the precoding.

(17) An integrated circuit according to the present invention causes a base station device to exhibit a plurality of functions, by being installed in the base station device. The integrated circuit causes the base station device to exhibit a series of functions of a function of receiving wireless frames transmitted by a terminal device of a nearby cell, a function of estimating the state of a propagation channel between the terminal device of the nearby cell and the own base station device, based on received signals of the wireless frame, a function of receiving propagation channel information notified from the terminal device of an own cell, based on the state of the propagation channel between the own base station device and the terminal device, a function of suppressing inter-user interference at the time of spatially multiplexing and simultaneously transmitting transmission data addressed to one or more terminal devices of the own cell, based on propagation channel information notified from one or more terminal devices of the own cell and the estimation results of the state of the propagation channel, and also performing precoding on transmission data addressed to the one or more terminal devices of the own cell so that a null is directed toward a terminal device of the nearby cell corresponding to estimation results of the state of the propagation channel, and a function step of transmitting the signals subjected to the precoding.

INDUSTRIAL APPLICABILITY

The present invention is preferably applied to base station devices, wireless communication systems, wireless communication methods, and integrated circuits.

REFERENCE SIGNS LIST 100, 100-1, 100-2 base station device
201 error-correction encoder
202 modulator
203 reference signal multiplexer
204 precoder
205 IFFT unit
206 GI insertion unit
207 wireless transmitter
208 antenna unit
209 wireless receiver
210 GI removal unit
211 FFT unit
212 reference signal demultiplexer
213 propagation channel estimator
214 equalizer
215 demodulator
216 error-correction decoder
217 upper layer
218 propagation channel information storage unit
219 propagation channel estimation results storage unit
220 terminal ID acquisition unit
300, 300-1 through 300-6 terminal device
301 antenna unit
302 wireless receiver
303 GI removal unit
304 FFT unit
305 reference signal demultiplexer
306 propagation channel estimator
307 equalizer
308 demodulator
309 error-correction decoder
310 error-correction encoder
311 demodulator
312 reference signal multiplexer
313 IFFT unit
314 GI insertion unit
315 wireless transmitter
316 upper layer

The invention claimed is:

1. A transmission device comprising:
a wireless receiver that receives a first wireless frame, which is a wireless frame transmitted by a first reception device;
propagation channel estimation circuitry that estimates a state of a first propagation channel between the first reception device and the transmission device, based on a received signal of the first wireless frame;
a precoder that performs precoding on transmission data addressed to a second reception device, based on the estimation results of the state of the first propagation channel; and
a wireless transmitter that transmits the precoded transmission data to the second reception device.

2. The transmission device according to claim 1, wherein the precoder performs precoding on the transmission data addressed to the second reception device so that a null is directed toward the first reception device, based on the estimation result of the state of the first propagation channel.

3. A wireless communication method of a transmission device that performs communication with a reception device, the wireless communication method comprising:
  a step of receiving a first wireless frame transmitted by a first reception device,
  a step of estimating a state of a first propagation channel between the first reception device and the transmission device, based on a received signal of the first wireless frame,
  a step of performing precoding on transmission data addressed to a second reception device based on the estimation results of the state of the first propagation channel, and
  a step of transmitting the precoded transmission data to the second reception device.

* * * * *